(12) United States Patent (10) Patent No.: US 11,554,491 B2
Karlsson et al. (45) Date of Patent: Jan. 17, 2023

(54) ROBOTIC SYSTEM AND METHOD OF MOVEMENT CONTROL USING SYNTHETIC ARRAY RADAR AND PASSIVE BEACONS

(71) Applicant: Sony Corporation, Tokyo (JP)

(72) Inventors: Peter C. Karlsson, Lund (SE); Mattias Falk, Lund (SE); Hannes Bergkvist, Lund (SE)

(73) Assignee: Sony Group Corporation, Tokyo (JP)

( * ) Notice: Subject to any disclaimer, the term of this patent is extended or adjusted under 35 U.S.C. 154(b) by 694 days.

(21) Appl. No.: 16/328,158

(22) PCT Filed: Oct. 26, 2016

(86) PCT No.: PCT/US2016/058798
§ 371 (c)(1),
(2) Date: Feb. 25, 2019

(87) PCT Pub. No.: WO2018/080471
PCT Pub. Date: May 3, 2018

(65) Prior Publication Data
US 2019/0184568 A1 Jun. 20, 2019

(51) Int. Cl.
*B25J 9/16* (2006.01)
*B25J 13/08* (2006.01)
(Continued)

(52) U.S. Cl.
CPC ........... *B25J 9/1694* (2013.01); *B25J 9/1692* (2013.01); *B25J 13/086* (2013.01); *G01S 13/10* (2013.01);
(Continued)

(58) Field of Classification Search
CPC ...... B25J 9/1694; B25J 13/086; B25J 19/021; B25J 9/1692; B25J 9/06; B25J 9/1623;
(Continued)

(56) References Cited

U.S. PATENT DOCUMENTS 10,011,016 B1 * 7/2018 Rembisz .............. B25J 11/0085
2009/0240372 A1   9/2009 Bordyn
(Continued)

FOREIGN PATENT DOCUMENTS

DE   102013113949 A1   6/2015
DE   102015104587 A1 * 9/2016 ............ B25J 9/1692
(Continued)

OTHER PUBLICATIONS

International Search Report and Written Opinion from corresponding International Patent Application No. PCT/US2016/058798, dated Jul. 3, 2017.

*Primary Examiner* — Khoi H Tran
*Assistant Examiner* — Tanner L Cullen
(74) *Attorney, Agent, or Firm* — Tucker Ellis LLP

(57) ABSTRACT

A system includes a moveable element adapted to move relative to a coordinate system defined for a robot, an object detection transceiver unit adapted to be mounted on the moveable element, and a controller. The controller controls the object detection transceiver unit to emit a signal and obtain a return signal for an operational cell of the robot at each of a series of predetermined positions to emulate a transceiver aperture larger than an aperture of the object detection transceiver unit. A location corresponding to a marker present in the operational cell is determined from the return signals. A predetermined operation is carried out where the predetermined operation includes using the determined location to guide movement of the robot.

18 Claims, 2 Drawing Sheets

(51) Int. Cl.
  *G05B 19/4155* (2006.01)
  *G01S 13/10* (2006.01)
  *B25J 9/06* (2006.01)
(52) U.S. Cl.
  CPC ............ *G05B 19/4155* (2013.01); *B25J 9/06* (2013.01); *B25J 9/1623* (2013.01); *G05B 2219/37097* (2013.01); *G05B 2219/37288* (2013.01); *G05B 2219/39012* (2013.01); *G05B 2219/39024* (2013.01); *G05B 2219/40623* (2013.01)
(58) Field of Classification Search
  CPC ........ B25J 13/089; B25J 9/1664; B25J 19/02; G05B 2219/37097; G05B 2219/39012; G05B 2219/37288; G05B 2219/39024; G05B 2219/40623; G05B 19/4155; G01S 13/90; G01S 13/10; G01S 13/881
  See application file for complete search history.

(56) References Cited

U.S. PATENT DOCUMENTS

| | | |
|---|---|---|
| 2010/0141506 A1 | 6/2010 | Gulden |
| 2011/0066393 A1 | 3/2011 | Groll |
| 2013/0096713 A1* | 4/2013 | Takizawa ............... B65G 61/00 700/224 |
| 2013/0204434 A1 | 8/2013 | Haderer |
| 2014/0100693 A1* | 4/2014 | Fong ..................... A47L 9/2873 700/253 |
| 2014/0285375 A1* | 9/2014 | Crain .................... G01S 13/865 342/25 A |
| 2015/0271991 A1* | 10/2015 | Balutis ................ G05D 1/0011 700/264 |
| 2015/0338196 A1* | 11/2015 | Cortelyou ............. H04N 7/183 700/253 |
| 2016/0059419 A1* | 3/2016 | Suzuki ................... B25J 9/1692 901/14 |
| 2016/0288332 A1* | 10/2016 | Motoyoshi ............ B25J 13/085 |
| 2016/0354929 A1* | 12/2016 | Ishige ................... B25J 9/1697 |
| 2018/0024521 A1* | 1/2018 | Matsuura .............. B25J 9/1692 700/83 |
| 2019/0033441 A1* | 1/2019 | Gonzales Valdes .. G01S 13/885 |

FOREIGN PATENT DOCUMENTS

| | | | |
|---|---|---|---|
| DE | 102015104587 A1 | 9/2016 | |
| EP | 2749982 A2 * | 7/2014 | ........... G05D 1/0234 |
| WO | 2014012628 A1 | 1/2014 | |
| WO | WO-2017137558 A1 * | 8/2017 | ........... B25J 9/1694 |

* cited by examiner

ROBOTIC SYSTEM AND METHOD OF MOVEMENT CONTROL USING SYNTHETIC ARRAY RADAR AND PASSIVE BEACONS

TECHNICAL FIELD OF THE INVENTION

The technology of the present disclosure relates generally to robotic systems and, more particularly, to a robotic system and method of controlling the movement of the robotic system using synthetic array radar that detects the locations of passive beacons and specifies the locations of the beacons in the coordinates of the robotic system.

BACKGROUND

The position, orientation and movement of an industrial robot are typically known using a coordinate system that is defined relative to the robot. For proper function, the positions of objects in the robot's surrounding environment must be made known to the control system of the robot.

There are several conventional techniques for determining the positions and orientations of objects in a robot's cell, but each have drawbacks. One exemplary conventional technique is referred to as jogging, where a user manually moves the robot with a joystick or other input device to effectively teach the robot where certain objects are located. Jogging tends to be time consuming and tends only to be used to determine the positions of static items prior to carrying out of robotic operations. Another technique uses "off-line" tools in which a user specifies the locations of objects in a simulated robotic environment. This technique involves creating a model of the robot's environment and is primarily limited to defining the positions of static items prior to carrying out of robotic operations.

Machine vision systems also have been used. Machine vision employs cameras to image the robot's environment and computers to assess the content of the resulting image data. The success of machine vision is dependent on lighting conditions, line of sight conditions, the programming of the computers, and other factors. Under the right conditions, machine vision systems can have success in detecting the positions of objects, but is not always an ideal solution.

SUMMARY

There is a need for improved ways of demining the locations of objects, particularly for industrial robot systems. Industrial robot systems are often used to perform routine, repeated tasks. An exemplary operation performed by an industrial robot system is a "pick and place" operation where an object is grasped at one location and moved to another location or assembled with another component. Other exemplary operations include welding, riveting, inspecting an object, applying decoration to an object, etc. The accomplishment of these tasks may be improved by better localization techniques for determining the locations of static objects in the robot's cell of operation (e.g., entry ports to a machine) and/or determining the locations, and possibly orientations, of moveable objects in the robot's cell of operation.

According to one aspect of the disclosure, a system includes a moveable element adapted to move relative to a coordinate system defined for a robot; an object detection transceiver unit adapted to be mounted on the moveable element; and a controller. The controller is configured to: control the object detection transceiver unit to emit a signal and obtain a return signal for an operational cell of the robot at each of a series of predetermined positions to emulate a transceiver aperture larger than an aperture of the object detection transceiver unit; determine a location corresponding to a marker present in the operational cell from the return signals, the marker reflective of the signals emitted by the object detection transceiver unit, and the location corresponding to the marker specified by the controller in the coordinate system; and carry out a predetermined operation including using the determined location to guide movement of the robot.

According to one embodiment of the system, the location determination includes generating, by the controller, a composite return image from the obtained return signals.

According to one embodiment of the system, the marker is adapted to be attached to an object that is acted upon as part of the predetermined operation.

According to one embodiment of the system, at least two markers are attached to the object and the controller is further configured to determine an orientation of the object.

According to one embodiment of the system, the obtaining of the return signals and the location determination are carried out during a configuration mode of the robot, wherein the location corresponding to the marker is stored in a memory for use in at least one iteration of the predetermined operation carried out during an operational mode of the robot.

According to one embodiment of the system, the controller is further configured to, in the operational mode, carry out another iteration of the obtaining the return signals and to determine a location corresponding to an additional marker introduced into the operational cell before an iteration of the predetermined operation, the stored location and the location corresponding to the additional marker being used to control movement of the robot during the iteration of the predetermined operation.

According to one embodiment of the system, the controller is further configured to delete the location corresponding to the additional marker from the memory before a subsequent iteration of the predetermined operation.

According to one embodiment of the system, a first marker and a second maker are present in the operation cell when the return signals are obtained, the second marker having a different physical characteristic than the first marker, the differing physical characteristics imparting differing signatures to components of the return signals respectively corresponding to the first and second markers.

According to one embodiment of the system, the object detection transceiver unit is configured to emit radar pulses and a distance between each successive predetermined position in the series is a sub-wavelength of the radar pulses.

According to one embodiment of the system, the moveable element is part of the robot.

According to one embodiment of the system, the robot is a serial or parallel robot.

According to another aspect of the disclosure, a method of controlling a robot where a moveable element moves relative to a coordinate system defined for the robot and an object detection transceiver unit is mounted on the moveable element, the method comprising: emitting a signal from the object detection transceiver unit and obtaining a return signal for an operational cell of the robot at each of a series of predetermined positions to emulate a transceiver aperture larger than an aperture of the object detection transceiver unit; determining a location corresponding to a marker present in the operational cell from the return signals, the marker reflective of the signals emitted by the object detection transceiver unit, and the location corresponding to the marker specified in the coordinate system; and carrying out a predetermined operation including using the determined location to guide movement of the robot.

According to one embodiment of the method, the determining of the location corresponding to the marker includes generating a composite return image from the obtained return signals.

According to one embodiment of the method, the marker is adapted to be attached to an object that is acted upon as part of the predetermined operation.

According to one embodiment of the method, at least two markers are attached to the object and the method further comprises determining an orientation of the object.

According to one embodiment of the method, the obtaining of the return signals and the determining of the location corresponding to the marker are carried out during a configuration mode of the robot and the location corresponding to the marker is stored in a memory for use in at least one iteration of the predetermined operation carried out during an operational mode of the robot.

According to one embodiment of the method, the method further comprises, in an operational mode, carrying out another iteration of the obtaining the return signals and determining a location corresponding to an additional marker introduced into the operational cell before an iteration of the predetermined operation, the stored location and the location corresponding to the additional marker used to control movement of the robot during the iteration of the predetermined operation.

According to one embodiment of the method, the method further comprises deleting the location corresponding to the additional marker from memory before a subsequent iteration of the predetermined operation.

According to one embodiment of the method, a first marker and a second marker are present in the operation cell when the return signals are obtained, the second marker having a different physical characteristic than the first marker, the differing physical characteristics imparting differing signatures to components of the return signals respectively corresponding to the first and second markers.

According to one embodiment of the method, the object detection transceiver unit is configured to emit radar pulses and a distance between each successive predetermined position in the series is a sub-wavelength of the radar pulses.

DETAILED DESCRIPTION OF EMBODIMENTS

Figure 1:
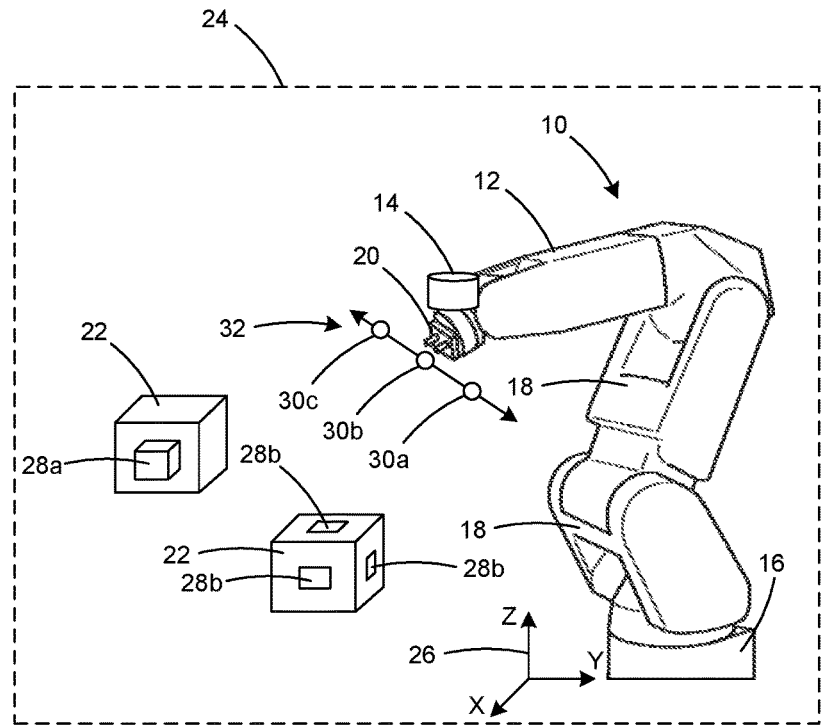
FIG. 1 is a representative diagram of an operational environment for an industrial robot system.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of systems and methods for achieving a high degree of localization accuracy in a short amount of time, and which is easy to use even in an environment with multiple, randomly placed objects.

Referring initially to FIG. 1, an exemplary system includes a robot 10 that has at least one moveable element 12 and an object detection transceiver unit 14 mounted at a known position on the moveable element 12. The robot 10 described herein is fixed in its geolocation, meaning that the moveable element 12 is moveable relative to a single known location. The known location relative to which the moveable element 12 is moveable is typically a stationary base 16 of the robot 10. As illustrated, additional moveable elements 18 may be interposed between the moveable element 12 and the base 16 to increase the freedom of movement or range of the moveable element 12. The robot 10 may include a work element 20 that performs an operation on an object 22 that is located within an operational cell 24 of the robot 10. The work element 20 may be, but is not limited to, a tool, a claw, or grasping elements. In the illustrated embodiment, the operational cell 24 is represented with a broken line. The robot 10 may be a serial robot or a parallel robot.

In another embodiment, the robot 10 may be moveable relative to its environment. For instance, the robot 10 may be equipped with wheels, tracks or legs that allow the robot 10 to move relative to its environment.

In a typical embodiment, the moveable element 12 to which the object detection transceiver unit 14 is mounted interacts with the object 22 or retains the work element 20 that interacts with the object 22. In another embodiment, the object detection transceiver unit 14 may be mounted to a first moveable element 12 and a second moveable element interacts with the object 22 or retains the work element 20 that interacts with the object 22. In this case, the second moveable element may be separate from the first moveable element 12 and/or may move independently of the first movement element 12.

The position, orientation and movement of the robot 10 are specified using a coordinate system 26 that is defined relative to the robot 10. An exemplary coordinate system 26 is a three-dimensional Cartesian coordinate system. The location of the moveable element 12, the object detection transceiver unit 14, the working element 20 and any other point in the cell 24 may be identified by a set of coordinate values from the coordinate system 26. Points specified using the coordinate system 26 need not be part of the robot 10. For instance, points related to the objects 22 may be specified using the coordinate system 26. Other items may be present in the cell 24 such as, but not limited to, conveyor devices, machines, support surfaces for the objects 22 and safety barriers. The locations of the items may be specified using the coordinate system 26. Points related to non-physical constructs, such as a plane past which the robot 10 should not cross, also may be specified using the coordinate system 26.

In some embodiments, the robot 10 has a dedicated function. That is, the robot 10 may be configured to perform one or more predetermined operations, such as a pick and place operation, a cutting operation, a securing operation (e.g., soldering, welding, riveting, screw insertion, etc.) or any other manufacturing or industrial task.

To facilitate carrying out of the robot's dedicated function, various locations in the cell 24 are learned using the object detection transceiver unit 14. To enhance the return signal to the object detection transceiver unit 14, one or more passive markers 28 are strategically placed within the cell 24. The markers 28 also may be referred to by the term "beacon."

The object detection transceiver unit 14 may be a radar transceiver or other assembly that may be used to determine the topological arrangement of objects. Another exemplary type of object transceiver unit 14 is a LIDAR, which is a laser-based system. For purposes of description, the systems and methods of this disclosure will be described in the exemplary context where the object detection transceiver unit 14 is a radar transceiver having a radar pulse transmitter and coordinating receiver. This does not prohibit the use of other types of object detection transceiver units 14 in the systems and methods.

The marker 28 is highly reflective of signals (e.g., electromagnetic waves) of the frequency emitted by the object detection transceiver unit 14. In the exemplary context of a radar-based object detection transceiver unit 14, when a radar pulse is emitted by the object detection transceiver unit 14, the corresponding electromagnetic waves will become incident on objects in the cell 24. Depending on the material of the object, some of the energy will be reflected and returned to the object detection transceiver unit 14. The markers 28 may be strategically placed, such as on the objects 22, at the entry points to machines in the cell 24, at safety boundaries, etc. It is contemplated that the markers 28 will reflect a larger portion of the energy incident thereon than the objects on which the markers 28 are placed. Therefore, the markers 28 will appear as "bright spots" in the return radar signal received by the object detection transceiver unit 14. In particular, the component of the return radar signal corresponding to the energy reflected by each marker 28 will have a higher value (e.g., signal strength) than the components of the radar signal reflected from most other objects. Furthermore, the locations of the markers 28 in the coordinate system 26 of the robot 10 may be readily ascertained, as will be described in greater detail below. The ascertained locations of the markers 28 may be used to guide operation of the robot 10 to perform its dedicated function.

The markers 28 may be attached to objects and/or positioned at other locations of interest. For instance, a marker 28 may be placed on an object 22 that is the subject of a pick and place operation.

In the illustrated embodiment, two types of markers 28 are illustrated. One marker type (denoted by reference numeral 28a) has a three dimensional configuration and is reflective to the radar signal on one or more exposed surfaces thereof. An exemplary three dimensional marker 28a is a marker body that may be permanently or temporary connected to an item 22 or another location in the cell 24. The marker 28a may be connected by securing the marker 28a with an adhesive or by mechanical interaction, such as with a clip, a screw or other fastener.

Another marker type (denoted by reference numeral 28b) has a two dimensional configuration and is reflective to the radar signal on its exposed surface. An exemplary two dimensional marker 28b is a sticker that may be permanently or temporarily adhered to an object 22 or other item with adhesive. Alternative, the marker 28b may be secured with a clip or other mechanical fastener.

The markers 28 in the illustrated embodiment are generally rectangular. Other shapes such as spherical bodies, pyramids, circles, ovals, etc. are possible.

As will be understood, each marker 28 is associated with a location. Each location of a marker may represent position information for the robot 10 that is used during operation of the robot 10. For instance, a marker's location may identify a position of an object 22 that is to be picked as part of a pick and place operation or may identify a destination location for a pick and place operation. In another exemplary situation, a marker's location may identify a boundary that the robot 10 should not cross. One or more markers 28 also may be present to indicate reference locations that are used in the determination of other locations or as calibration points.

Some positions and boundaries may be determined by identifying the locations of corresponding markers 28 that are positioned during a set up process (e.g., in a configuration mode). Once the positions and boundaries are determined, the markers 28 may be removed but the knowledge of the corresponding positions and boundaries may be retained for future operation of the robot 10. For instance, pick and place destinations and safety boundaries may be learned in this manner. Other positions may be determined during operation of the robot 10. For instance, the location of an object 22 to be picked may be identified and used in a pick and place operation. Position information that is dynamic (e.g., the location of an object 22 upon which operation of the robot 10 is to be carried out), may be deleted from a memory 29 of the robot 10 once used by the robot 10.

Two or more markers 28 may have different configurations so the return signals from the differently configured markers 28 have different signatures and are distinguishable from one another. Different return signals may be associated with different information that may be used by the robot 10 during operation. For instance, markers that have different return signal signatures may be used to distinguish different types of objects 22 or may be used to distinguish between objects 22 and stationary items in the cell 24.

One possible distinguishable configuration difference for the markers 28 is two dimensional markers and three dimensional markers. Another possible configuration difference is the size and/or shape of the markers 28. Another possible configuration difference is a pattern of dielectric material present on the markers 28 (e.g., stripes, solid, checkerboard, polka dot, etc.). In still another embodiment, one marker may have dielectric material of a first dielectric constant and a second marker may have dielectric material of a second dielectric constant that is different from the first dielectric constant. The differences in dielectric constant may alter the electrical characteristics of the electromagnetic waves respectively reflected from the markers in different manner so that the differences may be detected by the object detection transceiver unit 14. Plural types of configuration differences among the markers may be combined to increase the number of possible detectable differences among the markers.

In one embodiment, the object detection transceiver unit 14 is moved during scanning of the robot's environment to emulate a larger antenna (or aperture) than if the object detection transceiver unit 14 is kept in one position during scanning. For radar systems, this technique is known as synthetic aperture radar (SAR) and may be used to generate a relatively high resolution radar image.

The emulation process may include positioning the moveable element 12 on which the object detection transceiver unit 14 is mounted at a series of predetermined reference locations and obtaining a return signal (e.g., radar image or a topological map of the surroundings) at each of the predetermined reference locations. The distance between each successive predetermined reference location may be a sub-wavelength of the radar frequency, such a quarter wavelength or a half wavelength. The emulation process uses the motion of the object detection transceiver unit 14 over a targeted region to provide higher spatial resolution than would result from conventional beam-scanning radar.

In an exemplary emulation process, the moveable element 12 is initially placed in a first position 30a in an array 32 of positions 30. In FIG. 1, the array 32 and positions 30 along the array 32 are represented by a line and points along the line. The location of each position 30 is known and may be specified using the coordinate system 26. The array 32 need not be linear. Exemplary alternatives include positions 30 along an arc, a polygon that lies within a plane where the vertices of the polygon correspond to the positions 30, and a three dimensional shape having vertices that each correspond to a position 30. The array 32 may include as few as two positions 30, but three or more positions 30 may be used to achieve a desired resolution level for the resultant radar image.

At the first position 30a, a radar pulse is emitted and a return signal is captured by the object detection transceiver unit 14. The return signal is stored for analysis with return signals obtained at other positions 30 along the array 32. Next, the moveable element 12 is moved to a second position 30b where movement is stopped. At the second position 30b, a radar pulse is emitted and a return signal is captured by the object detection transceiver unit 14, which is stored for analysis with return signals obtained at other positions 30 along the array 32. In the illustrated embodiment, the moveable element 12 is moved to a third position 30c where movement is again stopped. At the third position 30c, a radar pulse is emitted and a return signal is captured by the object detection transceiver unit 14, which is stored for analysis with return signals obtained at other positions 30 along the array 32. This process is repeated for any remaining positions 30 in the array 32. In another embodiment, movement of the moveable element 12 is not stopped when the radar pulses are emitted and the return signals are obtained, but the radar pulses are emitted at the positions 30.

Once a return signal (e.g., radar image) is obtained for each position 30 in the array 32, the return signals are processed using SAR analysis techniques to determine the positions of the markers 28. The positions of the markers 28 are specified using the coordinate system 26. In one embodiment, determination of the positions of the markers may include generating a composite radar image from the return signals obtained at each of the positions 30 using SAR analysis techniques. In this embodiment, a topological map of at least a portion of the cell 24 may be generated by combining the data acquired at each of the array positions 30. The positions of the markers 28 within the topological map may then be identified using geometrical analysis.

Additional information may be derived from the radar data in conjunction with other known data, such as the shape and dimensions of the object 22 having markers 28. For example, the orientation of the object 22 in two dimensions may be determined using the locations of two markers 28 that are attached to the object 22 and geometrical analysis. Similarly, the orientation of the object 22 in three dimensions may be determined using the locations of three markers 28 that are attached to the object 22 and geometrical analysis. Also, if the position of the marker(s) 28 relative to the shape and dimensions of the object 22 is known, the position of the object 22 as a whole may be determined.

As will be understood, the collection of radar data may be carried out at various times. In some circumstances, the collection of radar data and marker localization may be carried out during a set-up routine. In the set up routine (e.g., during a configuration mode), an operator may strategically place markers 28 in the cell 24 and then command the robot 10 (e.g., via a user interface) to locate the markers 28. These locations are then associated with corresponding data used by the robot 10 during the execution of robotic operations. The corresponding data may include, for example, the identification of a destination for a pick and place operation or a boundary that the robot 10 should not cross. In other circumstances, the radar data and marker localization may be carried out during the operation of the robot for its predetermined function (e.g., during an operational mode). In the operation mode, the collection of radar data and marker localization may be carried out automatically as part of the robot's programmed routine. For example, the robot 10 may be programmed to identify the location and/or orientation of objects 22 from the determined locations of the markers 28, and act upon the identified location and orientation of the objects 22.

Figure 2:
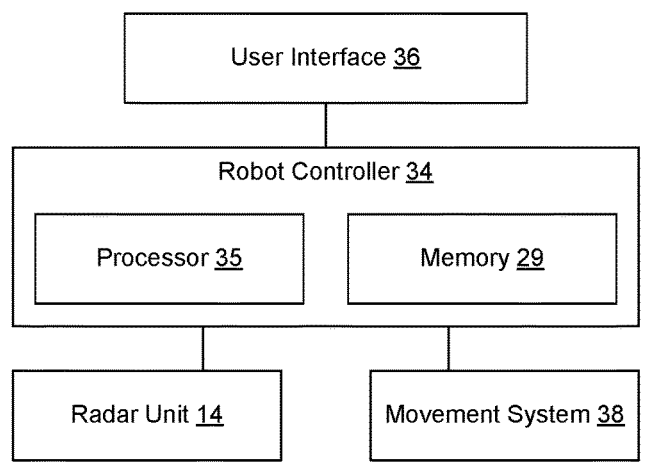
FIG. 2 is a schematic diagram of a control system for the robot system.

With additional reference to FIG. 2, additional details of the robot 10 will be described. The robot 10 includes a controller 34. The controller 34 may be a computer-based system having a processor 35 and a non-transitory computer readable medium (e.g., the memory 29) that executes logical instructions for carrying out the functions of the robot 10. The controller 34 may receive input from a user interface 36, which may include any appropriate inputs such as buttons, a joystick, a touch screen, a keyboard, a key pad, etc. In one embodiment, the user interface 36 includes a graphical user interface (GUI) that is displayed on a display.

The robot 10 may include the object detection transceiver unit 14. The controller 34 controls the object detection transceiver unit 14 to emit radar pulses and obtain return signals at appropriate times. The object detection transceiver unit 14 may include a transmitter for emitting radar pulses and a receiver for receiving the return signals. The return signals that are obtained by the receiver may be processed by the controller 34 or may be transmitted to a separate computer-based system for processing.

The robot 10 also includes a movement system 38. Under control by the controller 34, the movement system 38 controls the physical movements of the moveable member 12 and the additional moveable elements 18. The movement system 38 may include various motors and/or actuators (e.g., pistons).

Figure 3:
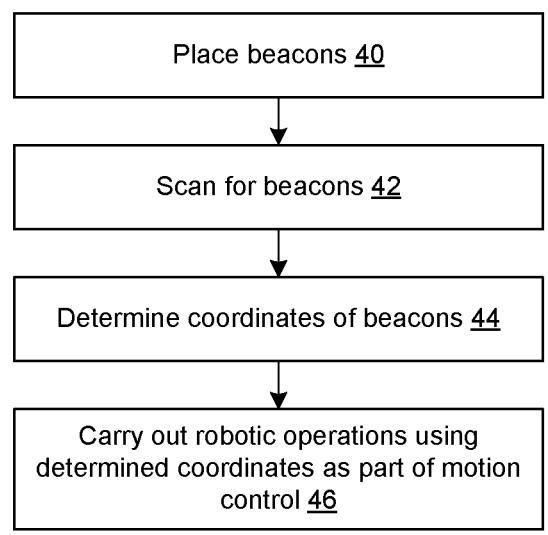
FIG. 3 is a flow-diagram of steps carried out in connection with the operation of the robot system.

With additional reference to FIG. 3, illustrated is an exemplary flow diagram representing steps that may be carried out in connection with the operation of the robot 10. Although illustrated in a logical progression, the illustrated blocks of FIG. 3 may be carried out in other orders and/or with concurrence between two or more blocks. Therefore, the illustrated flow diagram may be altered, including omitting steps.

In block 40, the markers 28 are placed in the cell 24. As indicated, placing the markers 28 may be performed by a user during configuration of the robot 10 and/or during operation of the robot 10 for its predetermined function. Markers 28 placed during operation of the robot 10 for its predetermined function may arrive in the cell 24 with objects 22 that are introduced into the cell 24 as part of an automated process or by persons. For instance, the robot 10 may perform a role in an assembly line or in an automated system, and the objects 22 may pass through the cell 24 as they are acted upon in the assembly line or in the automated process.

In block 42, the robot 10 scans for the presence of markers using SAR. Then, in block 44, the locations of markers 28 detected in the SAR scan of block 42 are determined. The locations may be specified in the coordinate system 26 of the robot 10. Thereafter, in block 46, the determined locations of the markers 28 are used in the motion control of the robot 10 during operation of the robot 10 to carry out its predetermined function(s).

Although certain embodiments have been shown and described, it is understood that equivalents and modifications falling within the scope of the appended claims will occur to others who are skilled in the art upon the reading and understanding of this specification.

What is claimed is:

1. A system, comprising:
a moveable element adapted to move relative to a coordinate system defined for a robot;
an object detection transceiver unit mounted on the moveable element; and
a controller configured to, in a configuration mode of the robot, determine one or more calibration points based on a location of at least one configuration mode marker within an operational cell of the robot to calibrate the robot, wherein the at least one configuration mode marker is positioned within the operational cell during a set up process in the configuration mode and the controller is configured to collect radar data and marker localization during the set up process, and in an operational mode of the robot, conduct a predetermined operation on each of plural objects that enter the operational cell of the robot, each object having a marker attached thereto, conducting the predetermined operation including:
control the object detection transceiver unit to conduct a synthetic aperture array scan of the operational cell of the robot by emitting a radar signal and obtaining a return signal for the operational cell of the robot at each of a series of predetermined positions to emulate a transceiver aperture larger than an aperture of the object detection transceiver unit;
determine a location corresponding to the object based on return signals of the marker attached to the object, the marker being reflective of the signals emitted by the object detection transceiver unit so that return signals reflected by the marker have a larger signal strength than return signals reflected by the object, and the location corresponding to the object is in the coordinate system; and
move the robot in accordance with the determined location to carry out a predetermined automated task on the object with the robot.

2. The system of claim 1, wherein the location determination includes generating, by the controller, a composite return image in the form of a topological map of at least a portion of the operational cell of the robot from the obtained return signals, the location of the object within the topological map being determinable by geometrical analysis.

3. The system of claim 1, wherein at least two markers are attached to the object and the controller is further configured to determine an orientation of the object from the return signals.

4. The system of claim 1, wherein, prior to entering the operational mode of the robot, conduct the configuration mode of the robot during which the at least one configuration mode marker is placed in the operational cell of the robot not attached to the object and a location of the at least one configuration mode marker is determined and stored in a memory for use in at least one iteration of the predetermined operation.

5. The system of claim 1, wherein each iteration of the predetermined operation further includes deleting the location corresponding to the object from a memory after the predetermined automated task on the object is conducted and before a subsequent iteration of the predetermined operation.

6. The system of claim 1, wherein a first marker and a second maker are present in the operational cell when the return signals are obtained, the second marker having a different physical characteristic than the first marker, the differing physical characteristics imparting differing signatures to components of the return signals respectively corresponding to the first and second markers.

7. The system of claim 1, wherein the object detection transceiver unit is configured to emit radar pulses and a distance between each successive predetermined position in the series is a sub-wavelength of the radar pulses.

8. The system of claim 1, wherein the moveable element is part of the robot.

9. The system of claim 1, wherein the robot is a serial or parallel robot.

10. The system of claim 1, wherein the at least one configuration mode marker identifies one or more reference locations within the operational cell used during the operational mode, and the one or more reference locations comprises one or more of pick and place destinations and safety boundaries.

11. The system of claim 1, wherein the controller is configured to further collect the radar data and marker localization in an automatic process as part of a programmed routine of the robot in the operational mode.

12. A method of controlling a robot where a moveable element moves relative to a coordinate system defined for the robot and an object detection transceiver unit is mounted on the moveable element, the method comprising, in a configuration mode of the robot, determining one or more calibration points based on a location of at least one calibration marker within an operational cell of the robot to calibrate the robot, wherein the at least one calibration marker is positioned within the operational cell during a set up process in the configuration mode and collecting radar data and marker localization during the set up process, and in an operational mode of the robot, conducting a predetermined operation on each of plural objects that enter the operational cell of the robot, each object having a marker attached thereto, conducting the predetermined operation including:
conducting a synthetic aperture array scan of the operational cell of the robot by emitting a radar signal from the object detection transceiver unit and obtaining a return signal for the operational cell of the robot at each of a series of predetermined positions to emulate a transceiver aperture larger than an aperture of the object detection transceiver unit;
determining a location corresponding to the object based on return signals of the marker attached to the object, the marker being reflective of the signals emitted by the object detection transceiver unit so that return signals reflected by the marker have a larger signal strength than return signals reflected by the object, and the location corresponding to the object is in the coordinate system; and
moving the robot in accordance with the determined location and carrying out a predetermined automated task on the object with the robot.

13. The method of claim 12, wherein the determining of the location corresponding to the object includes generating a composite return image in the form of a topological map of at least a portion of the operational cell of the robot from the obtained return signals, the location of the object within the topological map being determinable by geometrical analysis.

14. The method of claim 12, wherein at least two markers are attached to the object and the conducting the predetermined operation further comprises determining an orientation of the object from the return signals.

15. The method of claim 12, wherein, prior to entering the operational mode of the robot, conducting a configuration mode of the robot during which a configuration mode marker is placed in the operational cell of the robot and a location of the configuration mode marker is determined and stored in a memory for use in at least one iteration of the predetermined operation.

16. The method of claim 12, wherein each iteration of the predetermined operation further includes deleting the location corresponding to the object from a memory after the predetermined automated task on the object is conducted and before a subsequent iteration of the predetermined operation.

17. The method of claim 12, wherein a first marker and a second marker are present in the operational cell when the return signals are obtained, the second marker having a different physical characteristic than the first marker, the differing physical characteristics imparting differing signatures to components of the return signals respectively corresponding to the first and second markers.

18. The method of claim 12, wherein the object detection transceiver unit is configured to emit radar pulses and a distance between each successive predetermined position in the series is a sub-wavelength of the radar pulses.

* * * * *